United States Patent
Padoan

(10) Patent No.: US 7,148,634 B2
(45) Date of Patent: Dec. 12, 2006

(54) SYNCHRONIZATION DEVICE PARTICULARLY FOR AT LEAST TWO WINDSHIELD WIPERS

(75) Inventor: Massimo Padoan, Chioggia (IT)

(73) Assignee: Pine S.R.L., Chioggia (IT)

( * ) Notice: Subject to any disclaimer, the term of this patent is extended or adjusted under 35 U.S.C. 154(b) by 0 days.

(21) Appl. No.: 10/815,743

(22) Filed: Apr. 2, 2004

(65) Prior Publication Data

US 2004/0222753 A1 Nov. 11, 2004

(30) Foreign Application Priority Data

May 6, 2003 (IT) .......................... PD2003A0090

(51) Int. Cl.
*H02P 5/00* (2006.01)
*H02P 5/46* (2006.01)

(52) U.S. Cl. .................................. 318/85; 318/DIG. 2

(58) Field of Classification Search ................. 318/85, 318/DIG. 2
See application file for complete search history.

(56) References Cited

U.S. PATENT DOCUMENTS

| | | | | |
|---|---|---|---|---|
| 4,742,280 A | * | 5/1988 | Ishikawa et al. ............ | 318/282 |
| 5,157,314 A | * | 10/1992 | Kuhbauch .................... | 318/443 |
| 5,177,418 A | * | 1/1993 | Muller ........................ | 318/265 |
| 5,216,340 A | | 6/1993 | Welch | |
| 5,252,898 A | * | 10/1993 | Nolting et al. .............. | 318/444 |
| 5,508,595 A | * | 4/1996 | Schaefer ..................... | 318/444 |
| 5,568,026 A | * | 10/1996 | Welch ......................... | 318/443 |
| 5,630,009 A | * | 5/1997 | Hayden ...................... | 388/838 |
| 5,757,155 A | * | 5/1998 | Autran et al. ............... | 318/443 |
| 6,218,741 B1 | * | 4/2001 | Braun et al. ................ | 307/10.1 |
| 6,288,509 B1 | | 9/2001 | Amagasa | |

FOREIGN PATENT DOCUMENTS

| | | |
|---|---|---|
| DE | 34 41 842 | 5/1986 |
| DE | 44 28 543 | 2/1996 |

* cited by examiner

*Primary Examiner*—Lincoln Donovan
*Assistant Examiner*—Erick Glass
(74) *Attorney, Agent, or Firm*—Modiano & Associati; Albert Josif; Daniel O'Byrne

(57) ABSTRACT

A synchronization device particularly for at least two windshield wipers, comprising at least two wipers, each of which is composed of a blade that is kinematically connected to an electric motor or gearmotor in order to oscillate between two preset positions; elements for activating/deactivating the gearmotor; elements for signaling the transit of each one of the blades through a preset reference position; elements for controlling the signals and driving the activation/deactivation elements; elements for determining the wiping time for each one of the wipers; elements for calculating the lead time error of the at least one wiper that is faster with respect to the slower wiper of the at least two wipers; elements for calculating a correction time; elements for identifying the slower wiper and elements for applying each one of the correction times to the corresponding motor/gearmotor of the at least one faster wiper.

22 Claims, 8 Drawing Sheets

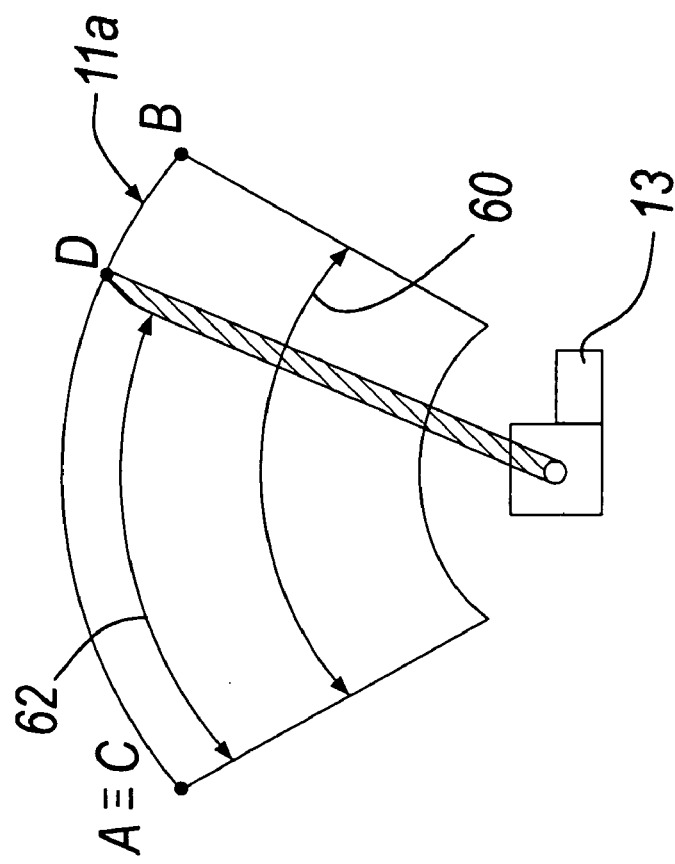
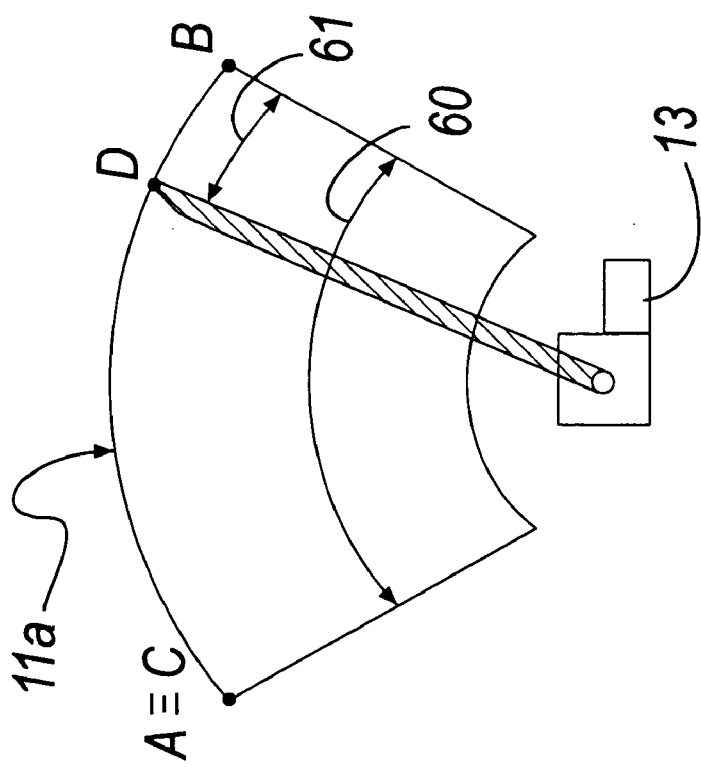
Fig. 9
Fig. 8

SYNCHRONIZATION DEVICE PARTICULARLY FOR AT LEAST TWO WINDSHIELD WIPERS

The present invention relates to a synchronization device particularly for at least two windshield wipers.

BACKGROUND OF THE INVENTION

The use of a windshield wiper system that optimizes the view available to the driver in any weather and climate condition is indispensable for any means of transport, from cars to trucks, from aircraft to watercraft and the like.

For larger vehicles it is necessary to resort to a windshield cleaning system that has a plurality of blades, each designed to wipe a delimited surface of said windshield.

This is the case of large watercraft, whose configuration can include up to five wiper blades or more.

For these systems with at least two blades, the market greatly appreciates systems in which each blade is operated by an electric gearmotor or motor.

In these systems, therefore, when the motors/gearmotors are powered, each blade moves independently of the others.

Shortly after activation, such independent motion of the wiper blades becomes uncoordinated and unpleasant and in the long run detrimental to the attention of the vehicle's pilot and accordingly for the entire crew.

Several synchronization devices for systems provided with at least two wipers are currently known.

A first type of these devices uses encoders to determine the position of the blades and then act on the rotation rate of each electric gearmotor/motor with methods of the PWM (Pulse Width Modulation) type.

A second type of these devices has a parking switch to stop the gearmotors in a given position.

The motor/gearmotor of the first blade that reaches the set position, known as parking position, stops and waits for the remaining blades to reach their respective parking positions.

Then, after a certain time interval required for the arrival of all the blades, the wipers restart together from a motionless condition.

The motors/gearmotors can be stopped by simply not supplying power to them or by short-circuiting the power supply terminals of each motor/gearmotor so that the motor acts as a brake.

These known devices are not free from drawbacks.

Encoder devices are inherently very expensive and also require, for the implementation of such methods of the Pulse Width Modulation type, driving circuits that are unavoidably complex and accordingly also relatively onerous from an economical standpoint.

The devices that can be classified under the second type have disadvantages that are linked above all to the waiting time required for all the wipers to reach the parking position.

Due to the many factors (friction, characteristics of the gearmotor and the like) that affect the wiping interval of a wiper, i.e., the time required by the blade to start and return to the same preset position, this interval may change in an uncontrolled manner with respect to the needs of a pilot, causing such unpleasant uncoordinated motion of the wiper blades.

Moreover, while on the one hand stopping the motors/gearmotors by not supplying them with power and without the aid of a braking system allows the wiper to continue its stroke even for a few seconds, fully to the detriment of the intended synchronization effect, on the other hand resorting to the braking action of the motor often leads to a dangerous overheating of the motors/gearmotors and to the unpleasant feeling of a jerky operation of the wipers.

SUMMARY OF THE INVENTION

The aim of the present invention is to provide a synchronization device particularly for at least two windshield wipers that solves the drawbacks of conventional synchronization devices.

Within this aim, an object of the present invention is to provide a synchronization device that can be installed on any land, air and water vehicle.

Another object of the present invention is to provide a device particularly for at least two windshield wipers that is capable of managing the synchronization of a much larger number of windshield wipers than said known synchronization devices.

A further object of the present invention is to provide a synchronization device that is capable of providing a plurality of synchronization modes according to the requirements of the user.

A still further object of the present invention is to provide a synchronization device that is capable of avoiding collisions between two blades when they cover overlapping areas in their motion.

Another object of the present invention is to provide a synchronization device that can be associated with user interfaces that are substantially of a known type and accordingly can be managed easily by a user who lacks particularly prior training.

Another object of the present invention is to provide a synchronization device that has a low cost and is easy to install.

Another object of the present invention is to provide a synchronization device particularly for at least two windshield wipers, which can be manufactured with known systems and technologies.

This aim and these and other objects that will become better apparent hereinafter are achieved by a synchronization device particularly for at least two windshield wipers, which comprises:

at least two wipers, each of which is composed of a blade that is kinematically connected to an electric motor/gearmotor in order to oscillate between two preset positions;

means for activating/deactivating said motor/gearmotor;

means for signaling the transit and direction of transit of each one of said blades through a preset reference position;

means for controlling the signals and driving said activation/deactivation means;

said synchronization device being characterized in that it also comprises:

means for determining the wiping time for each one of said wipers;

means for measuring, in relation to the transit of said at least two wipers at the respective means for signaling transit and direction of transit, the lead time error of the at least one wiper that is faster with respect to the slower wiper of said at least two wipers;

means for calculating a correction time in order to reduce said lead error of each one of said at least one faster wiper, each correction time being a function of said corresponding lead error;

means for identifying, at each wipe, the slower wiper;
means for applying each one of said correction times to said corresponding motor/gearmotor of said at least one faster wiper.

BRIEF DESCRIPTION OF THE DRAWINGS

Further characteristics and advantages of the present invention will become better apparent from the following detailed description of two preferred but not exclusive embodiments thereof, illustrated by way of nonlimiting example in the accompanying drawings, wherein:

FIG. 8 is a schematic view of some significant angles traced by a wiper managed by a device according to the invention;

FIG. 9 is a schematic view of further significant angles traced by a wiper managed by a device according to the invention;

DESCRIPTION OF THE PREFERRED EMBODIMENTS

Figure 1:
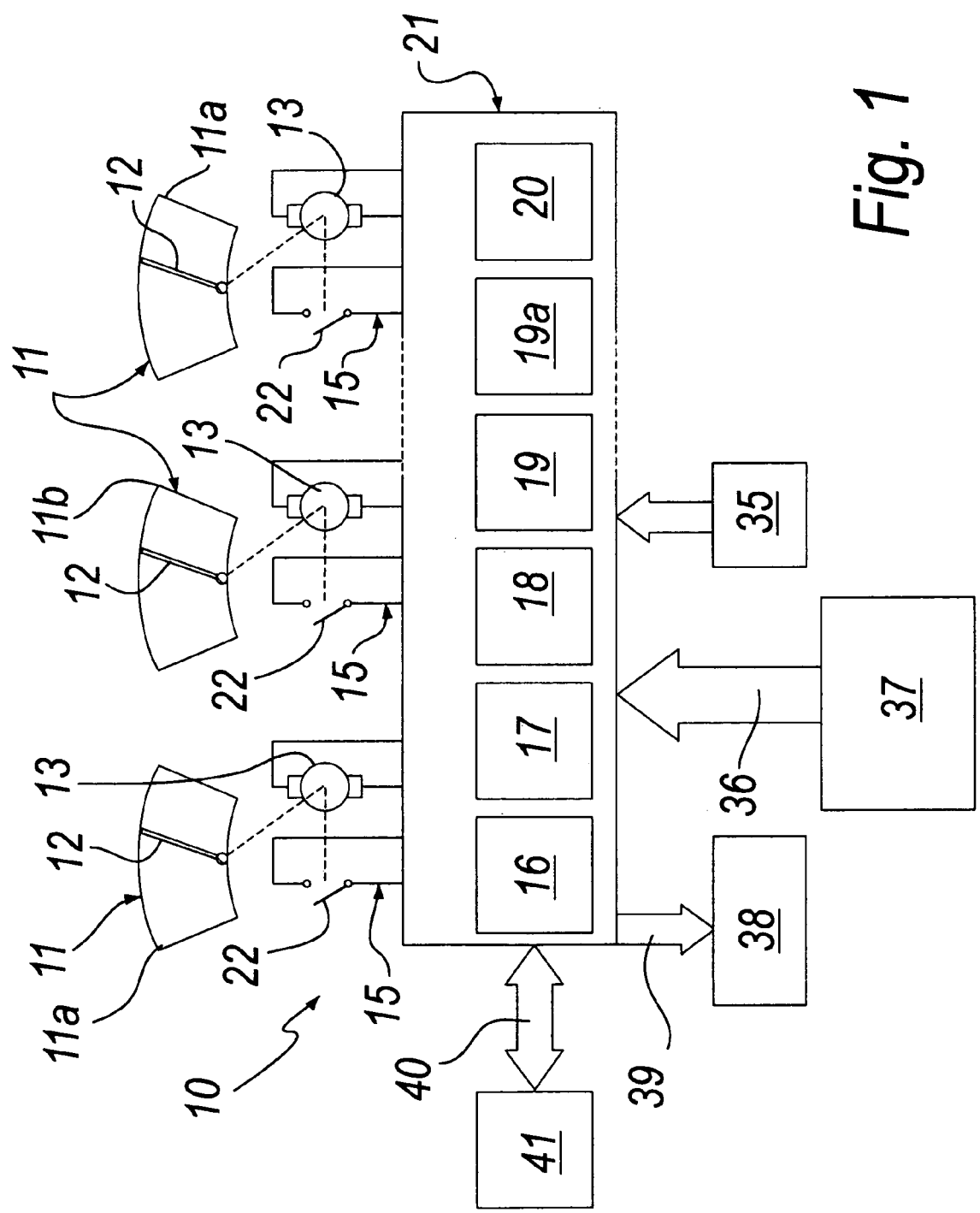
FIG. 1 is a block diagram of a device according to the invention in a first embodiment.

With reference to the figures, a synchronization device particularly for at least two windshield wipers according to the invention in a first embodiment is generally designated by the reference numeral 10.

Such device 10 comprises at least two wipers 11.

Each one of the wipers 11 is composed of a blade 12 that is kinematically connected to an electric motor/gearmotor 13.

Figure 3:
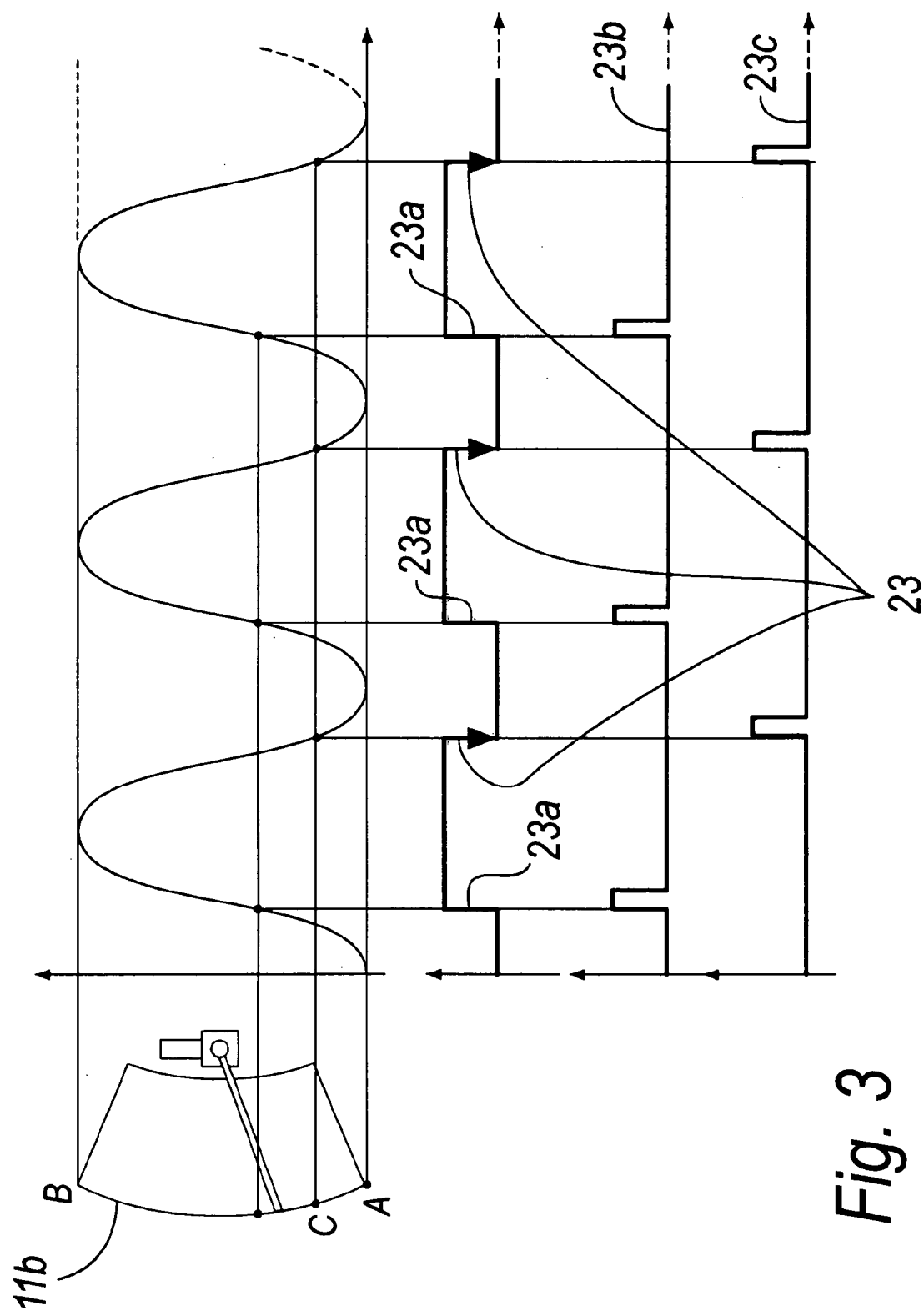
FIG. 3 is a view of the operation of said means for signaling the transit and the direction of transit of a wiper through a preset reference position.

Such electric motor/gearmotor 13 drives the corresponding blade 12 so that it oscillates between two preset positions, designated by the reference letters A and B in FIG. 3.

Moreover, the device 10 comprises means 14 for activating/deactivating the gearmotor 13.

There are also means 15 for signaling the transit and direction of transit of each one of the blades 12 through a preset reference position, designated by the reference letter C in FIG. 3.

Means 16 for controlling the signals and for driving the activation/deactivation means 14 are provided in addition to the means listed so far.

The synchronization device 10 also comprises means 17 for determining the wiping time, hereinafter referenced as Ts, for each one of the wipers 11, and means 18 for measuring, in relation to the transit of the wipers 11 at the respective transit signaling means 15, the lead time error, hereinafter referenced as Ea, of the at least one wiper 11a that is faster than the slower wiper 11b of the at least two wipers 11.

In the figures, the reference numeral 11a is assigned to the first and last wipers and the reference numeral 11b is assigned to the second wiper merely by way of example.

The slower wiper 11b can of course be any one of the wipers 11.

In the sequence of wipes, any wiper 11 can be the slowest wiper 11b.

The particularity of the device 10 also relates to the presence of means 19 for calculating a correction time, hereinafter referenced as Tc, for reducing the Ea of each one of the faster wipers 11a, each Tc being definable as a function of the corresponding Ea.

There are also means 19a for identifying, at each wipe, the slower wiper 11b.

Such means 19a, on the basis of the Tc values of each wiper 11, determine which is the slower wiper 11b to which the measurement of the lead errors of the faster wipers 11a is to be referred in the next wipe.

On the basis of these new Ea values, the Tc values are redefined.

The calculated Tc is then sent to means 20 for applying each one of the correction times to the corresponding motor/gearmotor 13 of the at least one faster wiper 11a.

The means 20 interrupt or reduce the power supply of the motor/gearmotor 13 so as to extend the wiping interval and reduce the Ea values.

Figure 13:
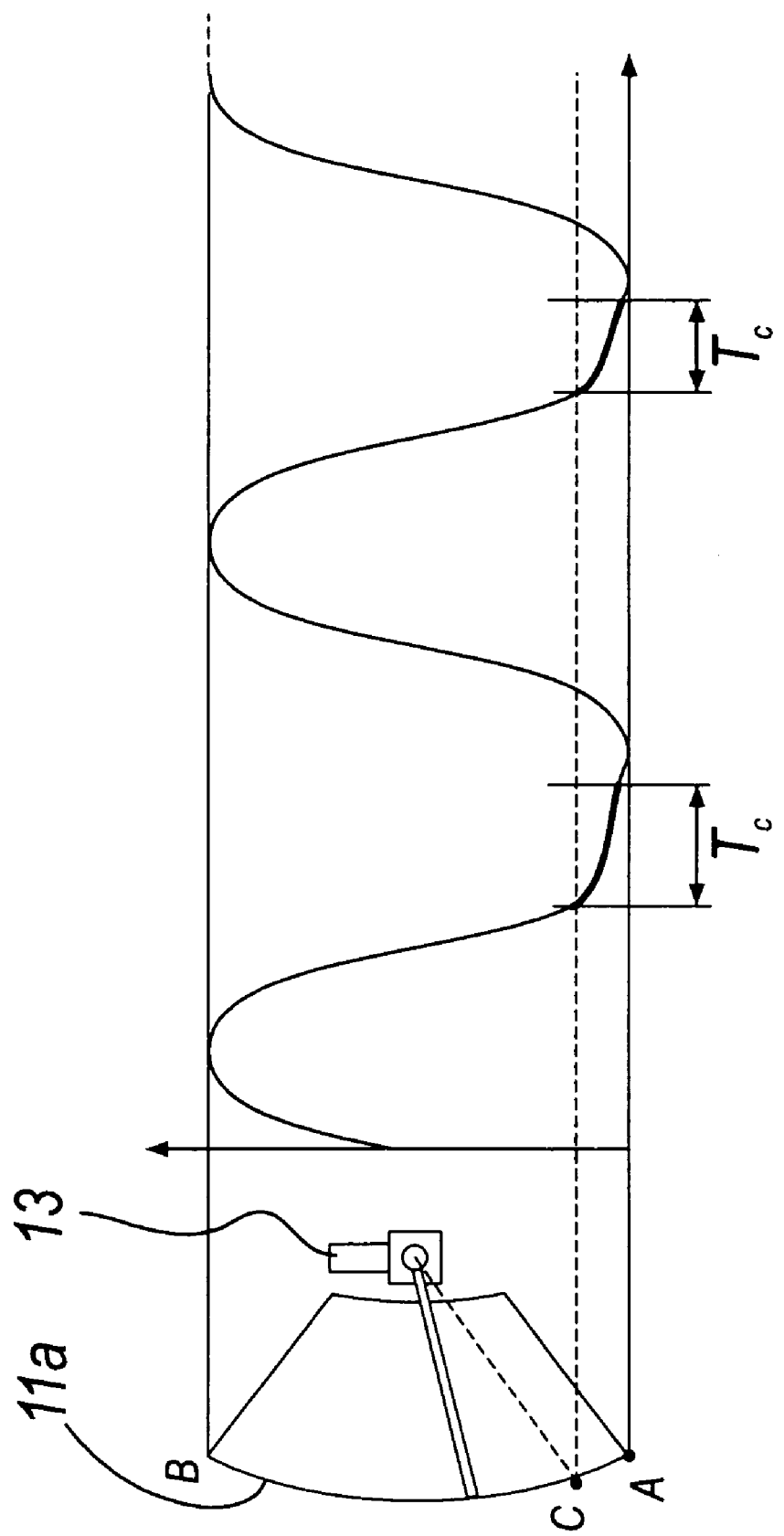
FIG. 13 is a schematic view of the application of the correction time to the operation of a faster wiper.

FIG. 13 plots schematically, by way of example, the variation of the motion of a wiper 11a produced by the application of the corresponding Tc.

The time variable is on the X-axis.

In the example given here, the activation/deactivation means 14 and the means 20 for applying such Tc values coincide.

The means 16 for controlling the signals and driving the activation/deactivation means 14, such means 17 for determining the wiping time, the means 18 for calculating the Ea, the means 19 for calculating the Tc and the means 19a for identifying the slower wiper 11b are integrated in a single synchronization control and management system 21.

The means 15 for signaling the transit of each one of the wipers 12 through the preset reference position C are constituted by a proximity switch 22 for each one of the wipers 11.

As an alternative, the signaling means 15 are constituted by an automatic parking switch, not shown.

The switch can be integrated within the motor/gearmotor 13.

The proximity or parking switch 22 emits a synchronization signal 23, shown in FIG. 3.

FIG. 3 illustrates, in relation to the movement of the blade of the slower wiper 11b, a square wave that plots the synchronization signal 23 as a function of the transit of the blade through the reference position C, at which the proximity or parking switch 22 is arranged.

The signals designated by the reference numerals 23a, 23b and 23c, also shown in FIG. 3, can be used for synchronization as an alternative.

The means 18 measure, at each wipe, the time interval between the synchronization signal of the at least one fast wiper 11a and the synchronization signal related to the slower wiper 11b.

This time interval is, as mentioned, the lead time error Ea.

The information regarding the Ea values is sent to the means 19 for calculating the corresponding Tc values and to the means 19a for identifying, on the basis of the value and sign of the Tc values, which is the slower wiper 11b to which the measurements of the Ea values and therefore the calculations of the Tc values updated to the slower wiper 11b are to be referred in the next wipe.

This correction time Tc is calculated as a function of said lead time error Ea, so that once it is applied to the fast wipers 11a by way of the application means 20, in the following wipes said Ea decreases over time so as to be as close as possible to zero.

The methods for establishing a relation between Tc and Ea are many, and all are within the scope of the inventive concept on which the present invention is based.

Four functions are described here by way of example.

A first function is of a directly proportional type and correlates Ea to Tc by means of a constant.

A second function is of the integrative type and sets Tc as a function of the integral of Ea over time.

A third function is of the proportional-integrative type and considers the sum of the first and second functions.

In a fourth function, the Tc calculated with any one of the three functions receives the addition of another term that depends on the variation rate of Ea and therefore comprises the derivative effect.

New Ea values on the basis of which the Tc values are calculated are determined at each transit of the wipers 11 through the respective switches 22.

These Tc values are applied to the fast wipers 11a identified in the preceding wipe by the means 19a for identifying the slower wiper 11b.

By means of the sequence of operations described above it is also possible to move at will the position where one wishes the wipers 11 to arrive simultaneously, which is designated by the reference letter D in the figures, without moving the proximity or parking switch 22 from the position C.

To achieve this, it is sufficient to subtract from each Ea the time interval calculated between arrival at the position D of each fast wiper 11a and the arrival in the same position D of the slow wiper 11b, assuming that the wipers 11 start from being motionless in the position C.

For each wiper 11a, the time interval is determined by the product of the corresponding Tc and the ratio between the angle covered by the blade starting from the last transit through the proximity or parking switch 22 with respect to the total wipe angle.

The total wipe angle is understood as the angle traced by the forward and return path of the blade from the switch 22 and therefore by twice the angle designated by the reference numeral 60.

These values are shown in the exemplifying FIGS. 8 and 9.

The angle traced by the blade is the sum of the angles 60 and 61 in the example of FIG. 8 and the angle designated by the reference numeral 62 in the example of FIG. 9.

With the same method, the blades can perform a synchronized motion, remaining mutually offset by a preset constant angle.

Figure 4:
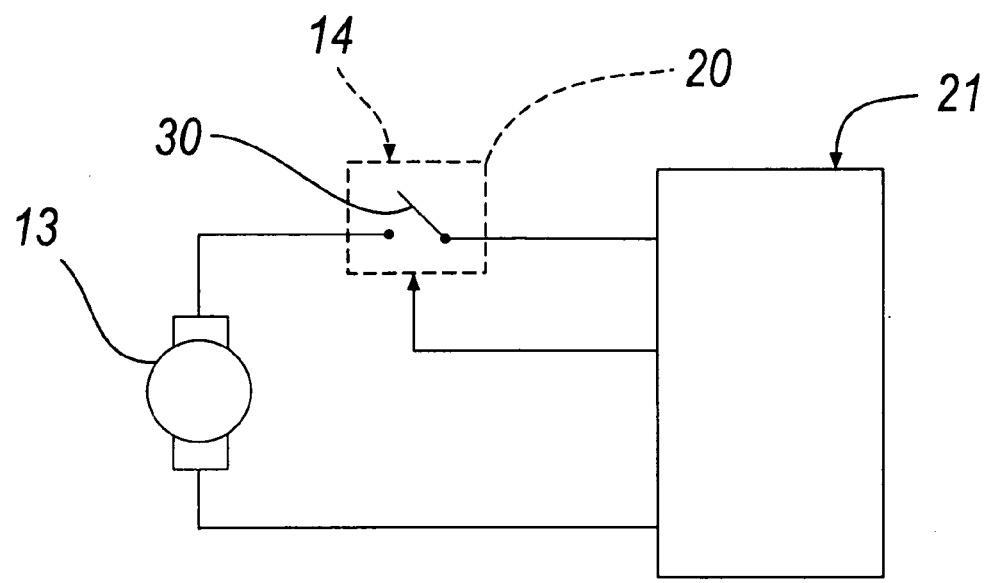
FIG. 4 is a view of a first variation of said means for applying each one of the correction times to the corresponding gearmotor.

In a first variation of this first embodiment, the means 20 for applying the correction time are constituted, for each one of said gearmotors 13, by a switch 30 that is suitable to fully remove power from the corresponding gearmotor 13, as shown in FIG. 4.

In a second variation of this first embodiment, the means 20 for applying the correction time are constituted, for each one of the gearmotors 13, by at least two switches in a parallel configuration, designated by the reference numerals 31a and 31b, which are suitable to reduce the supply of power of the corresponding gearmotor 13.

Figure 5:
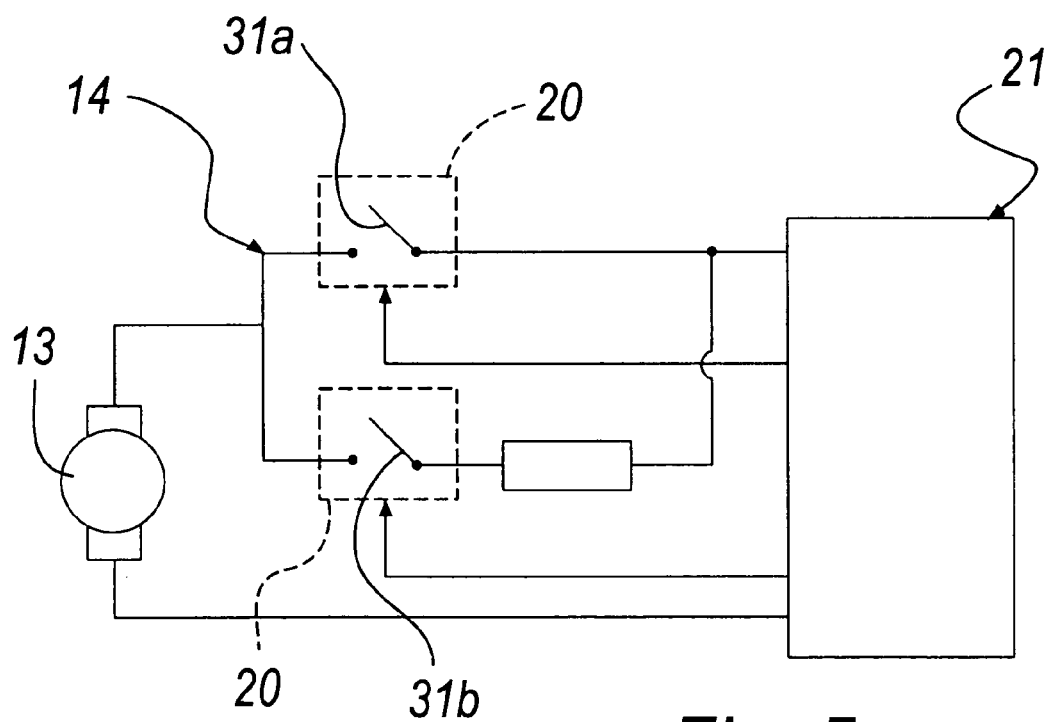
FIG. 5 is a view of a second variation of the means for applying each one of the correction times to the corresponding gearmotor.

This solution is shown in FIG. 5.

Figure 6:
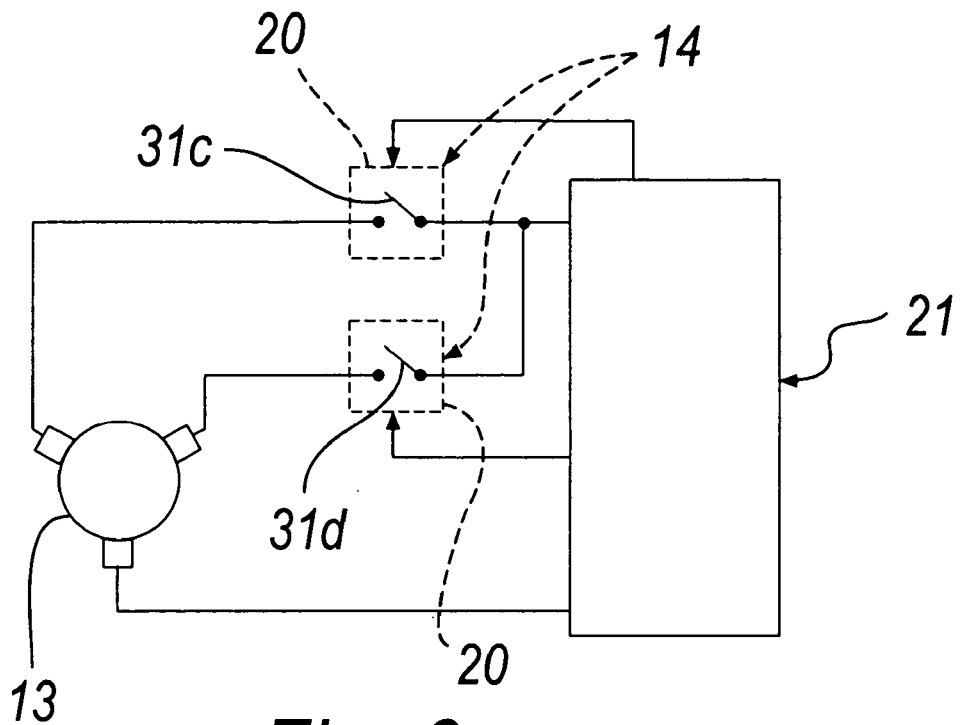
FIG. 6 is a view of a third variation of the means for applying each one of the correction times to the corresponding gearmotor.
Figure 7:
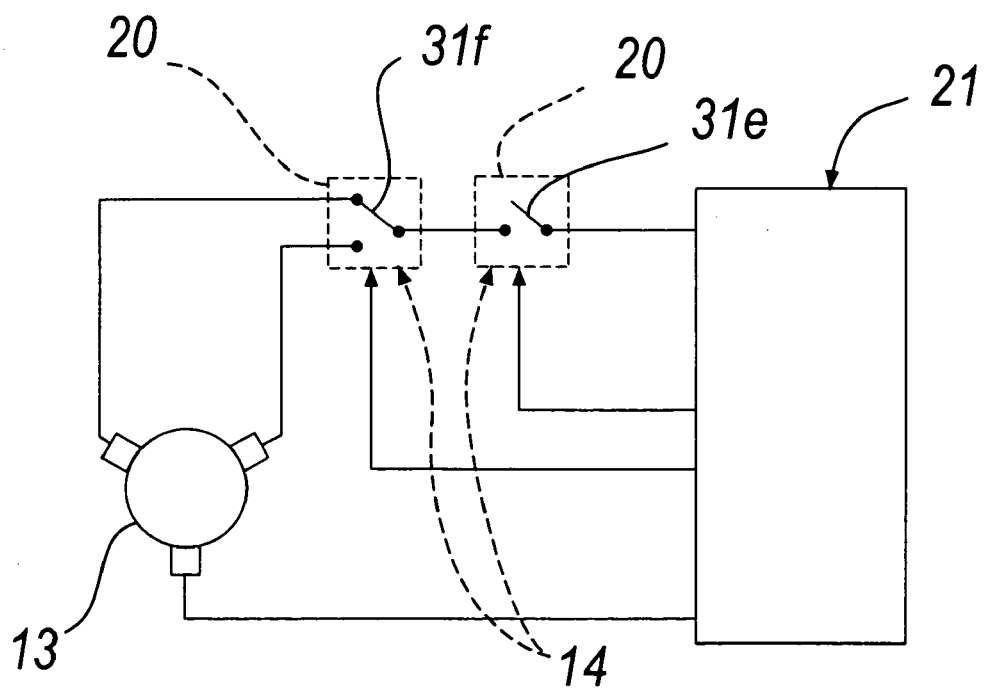
FIG. 7 is a view of a fourth variation of the means for applying each one of the correction times to the corresponding gearmotor.
Figure 10:
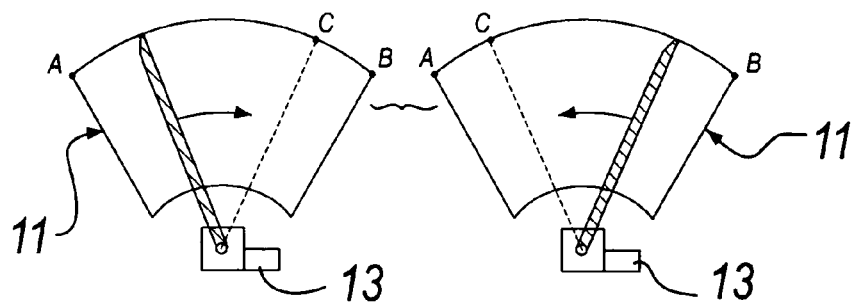
FIG. 10 is a view of a first example of synchronization for two wipers.

A third variation and a fourth variation for the application means 20 are shown in FIGS. 6 and 7 respectively.

In these third and fourth variations, the motor/gearmotor 13 is of the two-speed type.

In the third variation of this first embodiment, the means 20 for applying the correction time are constituted, for each one of said two-speed gearmotors 13, by two switches in a parallel configuration, respectively 31c and 31d, for two different speeds of the motor/gearmotor.

In the fourth variation, the means 20 for applying the correction time are constituted by two switches 31e and 31f arranged in series.

A first switch 31e controls the flow of current and the second switch 31f supervises speed selection.

As shown in FIG. 1, the device 10, in addition to being completed by known elements such as the power supply 35, can also comprise input controls 36 provided by the on/off buttons for the entire system and for the individual wipers 11, intermittent operation adjustment devices, switches for use of the motor as a brake, rain sensors and the like grouped within the element 37.

The device 10 can also comprise a plurality of additional known devices 38, for example spraying pumps and the like, that are suitable to operate on the basis of output signals 39 related to the state of the wipers 11, to the reporting of faults, and the like.

There can also be means 40 for serial communication with additional devices and systems 41 for remote monitoring and control and the like.

Figure 11:
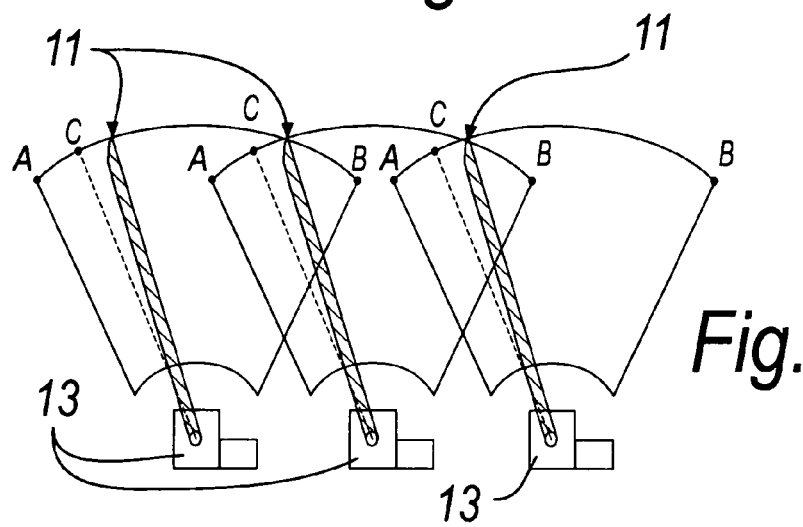
FIG. 11 is a view of a second example of synchronization for three wipers.

FIG. 11 illustrates a second example of application of the device 10, which relates to three wipers 11 that cover partially overlapping areas.

Figure 12:
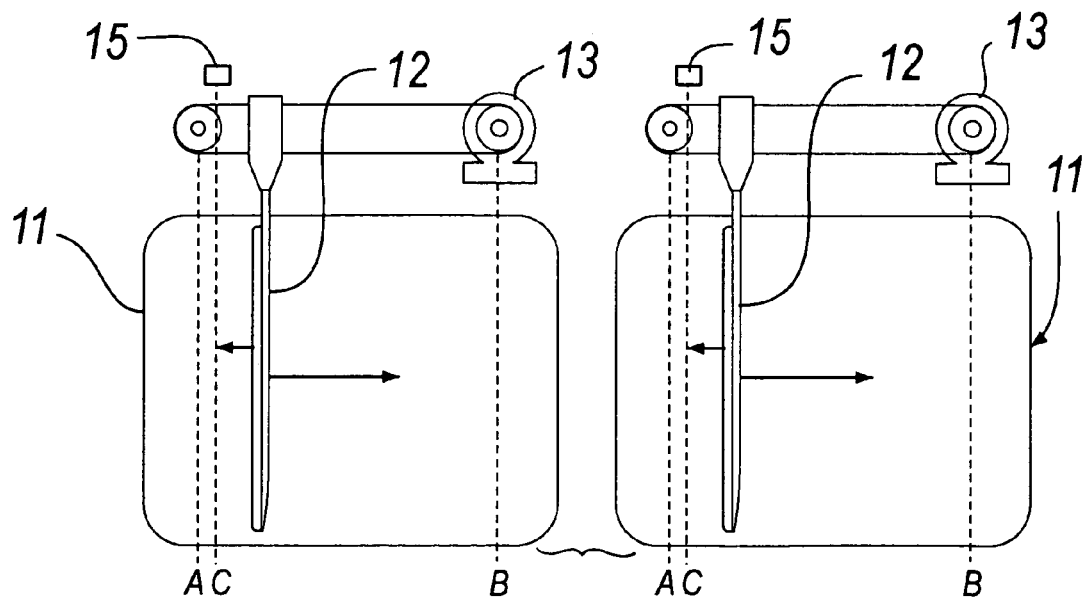
FIG. 12 is a view of a third example of synchronization for two wipers.

FIG. 12 is a view of a third example of application of a device 10 according to the invention, arranged so as to control two wipers 11 with blades that perform a translational motion.

Figure 2:
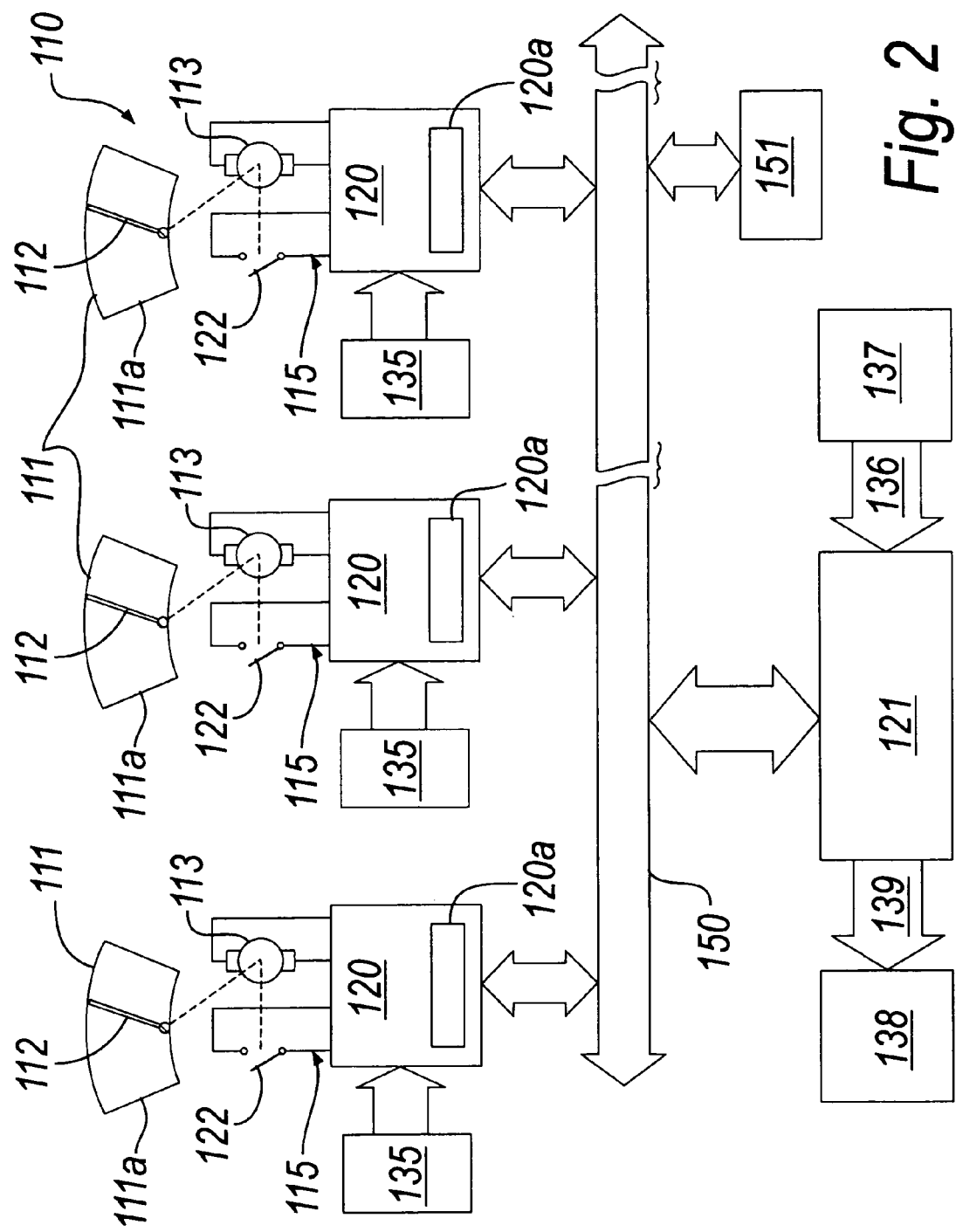
FIG. 2 is a block diagram of a device according to the invention in a second embodiment.

In a second embodiment of the syactronization device according to the present invention, shown in FIG. 2 (in which elements of such second embodiment which are similar to like elements of the first embodiment of FIG. 1 have reference numerals increased by 100), and generally designated by the reference numeral 110, each wiper 111 with the corresponding means 120 for applying the Tc is connected, by means of an appropriately provided interface 120a to a parallel, serial or mixed communications bus 150, which in turn is functionally connected to a remote control system 121, which can also be an ordinary personal computer, and to other peripherals 151.

In a manner similar to the first embodiment of FIG. 1, the remote control system contains 121 contains: means for controlling the signals and driving the activation/deactivation means; means for determining the wiping time for each one of the wipers; means for identifying, at each wipe, the slower wiper; means for measuring the lead time en-or of the at least one faster wiper with respect to the slower wiper; and means for calculating a correction time in order to reduce the lead error of each one of the at least one faster wiper.

As an alternative to the communications bus 150, the means 120 and the remote control 121 are connected by means of an optical or radio link.

The reference numeral 135 designates the power supply systems of the individual means 120.

In practice it has been found that the described invention solves the problems noted in conventional synchronization devices particularly for at least two wipers and achieves the intended aim and objects.

In particular, the present invention provides a device that is capable of providing a plurality of synchronization modes according to the requirements of the user and of avoiding collisions between two blades when they cover overlapping regions in their motion.

The invention thus conceived is susceptible of numerous modifications and variations, all of which are within the scope of the appended claims; all the details may further be replaced with other technically equivalent elements.

In practice, the materials employed, so long as they are compatible with the specific use, as well as the dimensions, may be any according to requirements and to the state of the art.

The disclosures in Italian Patent Application No. PD2003A000090 from which this application claims priority are incorporated herein by reference.

What is claimed is:

1. A synchronization device for at least two windshield wipers, of the type that comprises:
    at least two wipers, each of which is composed of a blade that is kinematically connected to an electric motor/gearmotor in order to oscillate between two preset positions;
    means for activating/deactivating said motor/gearmotor;
    means for signaling the transit and direction of transit of each one of said blades through a preset reference position;
    means for controlling the signals and driving said activation/deactivation means;
    said synchronization device also comprising:
    means for determining, at each wipe, the wiping time for each one of said wipers;
    means for measuring, at each wipe, and in relation to the transit of said at least two wipers at the respective means for signaling transit and direction of transit, the lead time error of each one of the at least one wiper that is faster with respect to the slower wiper of said at least two wipers;
    means for calculating, at each wipe, a correction time in order to reduce said lead time error of each one of said at least one faster wiper such that each correction time is a function of said corresponding lead time error;
    means for identifying, at each wipe, said slower wiper;
    means for applying, at each wipe, each one of said correction times to said corresponding motor/gearmotor of each one of said at least one faster wiper which interrupt/reduce power of the corresponding motor/gearmotor and reduce the corresponding lead time error.

2. The device of claim 1, wherein said means for controlling the signals and for driving said activation/deactivation means, said means for determining the wiping time for each one of said wipers, said means for measuring said lead error, said means for calculating said correction time and said means for identifying, at each wipe, the slower wiper are integrated in a single system for synchronization control and management.

3. The device of claim 1 wherein each wiper with the corresponding means for applying the correction time is connected, by means of an interface, to a communications bus, which in turn is functionally connected to a remote control system.

4. The device of claim 1, wherein each wiper with the corresponding means for applying the correction time is functionally connected to a remote control system by means of an optical or radio link.

5. The device of claim 3, wherein said remote control system contains said means for controlling the signals and driving said activation/deactivation means, said means for determining the wiping time for each one of said wipers, said means for identifying, at each wipe, the slower wiper, said means for measuring the lead time error of the at least one faster wiper with respect to said slower wiper, and said means for calculating a correction time in order to reduce said lead error of each one of said at least one faster wiper.

6. The device of claim 1, wherein said means for applying said correction times are constituted by said activation/deactivation means.

7. The device of claim 1, wherein said means for signaling the transit and direction of transit of each one of said blades through a preset reference position are constituted by a proximity switch for each one of said wipers, said proximity switch being adapted to emit a synchronization signal.

8. The device of claim 1, wherein said means for signaling the transit and direction of transit of each one of said wipers for a preset reference position are constituted by an automatic parking switch for each one of said wipers, said automatic parking switch being adapted to emit a synchronization signal.

9. The device of claim 1, wherein said means for applying said correction time are constituted, for each one of said gearmotors, by a switch that removes power completely from the corresponding gearmotor.

10. The device of claim 1, wherein said means for activating/deactivating said motor/gearmotor comprise said means for applying said correction time, said means for applying said correction time are constituted, for each one of said gearmotors, by at least two switches in a parallel configuration, which reduce the power supply of the corresponding gearmotor.

11. The device of claim 1, wherein said electric motor/gearmotor is of the two-speed type.

12. The device of claim 1, wherein said means for activating/deactivating said motor/gearmotor comprise said means for applying said correction time, said means for applying said correction time are constituted, for each one of said gearmotors, by two switches in a parallel configuration, which select the rotation rate.

13. The device of claim 1, wherein said means for activating/deactivating said motor/gearmotor comprise said means for applying said correction time, said means for applying said correction time are constituted, for each one of said gear/motors, by two switches In a series configuration, a first switch which activates/deactivates said motor/gearmotor, a second switch which selects the speed.

14. A synchronization device for at least two windshield wipers, of the type that comprises:

at least two wipers, each of which is composed of a blade that is kinematically connected to an electric motor/gearmotor in order to oscillate between two preset positions;

means for activating/deactivating said motor/gearmotor;

means for signaling the transit and direction of transit of each one of said blades through a preset reference position;

means for controlling the signals and driving said activation/deactivation means;

said synchronization device also comprising:

means for measuring, at each wipe, and in relation to the transit of said at least two wipers at the respective means for signaling transit and direction of transit, the lead time error of each one of the at least one wiper that is faster with respect to the slower wiper of said at least two wipers;

means for calculating, at each wipe, a correction time in order to reduce said lead time error of each one of said at least one faster wiper such that each correction time is a function of said corresponding lead time error;

means for applying, at each wipe, each one of said correction times to said motor/gearmotor to reduce said lead time error.

15. The device of claim 1, further comprising means for selecting a position of simultaneous arrival for said at least two wipers.

16. The device of claim 1, wherein said means for identifying said slower wiper are configured to identify said slower wiper based upon a value and a sign of said correction time.

17. The device of claim 14, further comprising means for selecting a position of simultaneous arrival for said at least two wipers.

18. The device of claim 14, further comprising means for identifying said slower wiper that are configured to identify said slower wiper based upon a value and a sign of said correction time.

19. A method for synchronizing at least two windshield wipers each of which is composed of a blade that is kinematically connected to an electric motor/gearmotor in order to oscillate between two preset positions, comprising the steps of:

signaling a transit movement of each one of said blades through a preset reference position;

measuring, at each wipe, and In relation to the transit of said at least two wipers, a lead time error of each one of said at least two wipers that is faster with respect to a slower wiper of said at least two wipers;

calculating, at each wipe, a correction time in order to reduce said lead time error of each one of said at least two wipers that is faster with respect to a slower wiper of said at least two wipers such that each correction time is a function of said corresponding lead time error, and applying, at each wipe, each one of said correction times to a respective said motor/gearmotor to reduce said lead time error.

20. The method according to claim 19, further comprising identifying, at each wipe, said slower wiper, based upon a value and a sign of said correction time.

21. The method according to claim 20, further comprising determining, at each wipe, a wiping time for each one of said wipers.

22. The method according to claim 21, further comprising selecting a position of simultaneous arrival for said at least two wipers.

* * * * *